(12) United States Patent
Hayakawa et al.

(10) Patent No.: US 7,891,262 B2
(45) Date of Patent: Feb. 22, 2011

(54) TRANSMISSION FOR VEHICLES

(75) Inventors: Koshi Hayakawa, Saitama (JP); Kanau Iwashita, Saitama (JP); Yoshihisa Ieda, Saitama (JP); Akihiko Tomoda, Saitama (JP); Katsumi Sahoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 12/176,847

(22) Filed: Jul. 21, 2008

(65) Prior Publication Data
US 2009/0084208 A1 Apr. 2, 2009

(30) Foreign Application Priority Data

Sep. 28, 2007 (JP) ............................. 2007-256536
Sep. 28, 2007 (JP) ............................. 2007-256537

(51) Int. Cl.
*F16H 59/00* (2006.01)
(52) U.S. Cl. .................................................. 74/337.5
(58) Field of Classification Search ....................... None
See application file for complete search history.

(56) References Cited

U.S. PATENT DOCUMENTS 6,619,450 B2 * 9/2003 Ota et al. .................... 192/3.56
7,617,904 B1 * 11/2009 Einboeck et al. ............. 180/336
2008/0236321 A1 * 10/2008 Hayakawa et al. .......... 74/473.1
2010/0050805 A1 * 3/2010 Hayakawa et al. ....... 74/473.28

FOREIGN PATENT DOCUMENTS

| EP | 1 138 546 A2 | 10/2001 |
|---|---|---|
| JP | 02-212675 A | 8/1990 |
| JP | 2002-067741 A | 3/2002 |

* cited by examiner

*Primary Examiner*—Dirk Wright
(74) *Attorney, Agent, or Firm*—Birch, Stewart, Kolasch & Birch, LLP

(57) ABSTRACT

A shift position changing drive member for a transmission includes an arm member capable of turning around the axis of a shift spindle for drivingly turning a shift drum in response to the turning of the shift spindle wherein the shift drum is prevented from coming into a neutral position even if the shifting speed is stopped in midstream. A lost motion spring includes gripping portions gripping a pressing portion from both sides of a coil portion surrounding the shift spindle. An arm member of shift position changing drive member is provided with a pressure-receiving member which is gripped by both gripping portions in such a manner that when the turning member is turned, if, in response to the turning direction, the pressing portion abuts against one of the gripping portions for turning, the other of the gripping portions abuts against the pressure-receiving member.

19 Claims, 11 Drawing Sheets

US 7,891,262 B2

TRANSMISSION FOR VEHICLES

CROSS-REFERENCE TO RELATED APPLICATIONS

The present application claims priority under 35 USC 119 to Japanese Patent Application No. 2007-256537 filed on Sep. 28, 2007 and Japanese Patent Application No. 2007-256536 filed on Sep. 28, 2007 the entire contents of which are hereby incorporated by reference.

BACKGROUND OF THE INVENTION

1. Field of the Invention

The present invention relates to a transmission for a vehicle that includes a gear shifting mechanism provided with a plurality of selectively establishable gear trains for speed steps between a speed change input shaft and a speed change output shaft. A clutch is adapted to switch between connection and disconnection of power transmission between a power source output shaft and the speed change input shaft with a shift drum turnably carried by an engine case so as to selectively establish the gear trains in response to a turning position. A shift spindle is turnably attached to the engine case so as to turn in response to shifting operation. A shift position changing drive means is provided having an arm member capable of turning around the axis of the shift spindle and being adapted to drivingly turn the shift drum in response to turning of the shift spindle.

In addition, the present invention relates to a transmission for a vehicle that includes a plurality of gear trains for speed steps accommodated in an engine case so as to enable selective engagement. A shift drum is turnably carried by the engine case so as to selectively establish the gear trains in response to a turning position. Shifting position changing drive means are provided for covering one end of the shift drum so as to drivingly turn the shift drum in response to a shift operation. A shifting position sensor detects which one of the gear trains is established.

2. Description of Background Art

As disclosed in Japanese Patent Laid-open No. Hei 2-212675, a transmission for a motorcycle is known that is devised to drivingly turn a shift drum by turning an arm member secured to a shift spindle by turning of the shift spindle.

The transmission as disclosed in Japanese Patent Laid-open No. Hei 2-212675 requires that when a shifting operation is performed to turn a shift spindle, if it is stopped in the power transmission state of a clutch, it is stopped at the neutral position. In addition, when control is exercised to reduce output torque of an engine during the shifting, if the shifting operation is stopped at the neutral position as described above, the above control is continued as a result of a determination in which the shifting operation is not finished. Further, there is a possibility that a shifting operational load may excessively be applied to component parts such as a shift drum and the like.

A transmission for a motorcycle is disclosed in Japanese Patent Laid-open No. 2002-67741 that is devised to directly detect the turning amount of a shift drum by a shifting position sensor in order to detect a shifting position.

The transmission as disclosed in Japanese Patent Laid-open No. 2002-67741 includes a shifting position sensor often disposed inside an engine case. In such a situation, it is desired to enhance the maintenance performance for the shifting position sensor.

SUMMARY AND OBJECTS OF THE INVENTION

In view of the foregoing the present invention has been made and it is an object of an embodiment of the present invention to provide a transmission for a vehicle that can prevent a shifting operation from being brought into a neutral position even if it is stopped in midstream for preventing an excessively large shifting operational load from being applied to the shift drum side.

To achieve the above object, according to an embodiment of the present invention a transmission for a vehicle includes a gear shifting mechanism in which a plurality of selectively establishable gear trains for respective speed steps are provided between a speed change input shaft and a speed change output shaft. A clutch is adapted to switch between a connection and a disconnection of power transmission between a power source output shaft and the speed change input shaft. A shift drum is turnably carried by an engine case so as to selectively establish the gear trains in response to a turning position. A shift spindle is turnably attached to the engine case so as to turn in response to shifting operation. A shifting position changing drive means is provided having an arm member being capable of turning around an axis of the shift spindle and enabling to drivingly turn the shift drum in response to turning of the shift spindle. A turning member is secured to the shift spindle and projectingly provided with a pressing member. A lost motion spring in which gripping portions gripping the pressing portion from both sides is provided at both sides of a coil portion surrounding the shift spindle. The arm member is provided with a pressure-receiving member which is gripped by both the gripping portions in such a manner that when the turning member is turned, in response to the turning direction, the pressing portion is abutted against one of both the gripping portions for turning, the other of the gripping portions and is abutted against the pressure-receiving member.

According to an embodiment of the present invention, a shift cover is mounted to the engine case so as to define an operational chamber between the engine case and the shift cover, the operational chamber accommodating a portion of the shift spindle, the turning member, the lost motion spring and the shift position changing drive means, and a turning member turning-amount detecting means for detecting a turning amount of the turning member is secured to the shift cover.

According to an embodiment of the present invention, further including drum turning amount detecting means for detecting the turning amount of the shift drum, opening angle calculating means for calculating an opening angle between the arm member and the turning member on the basis of a detection value of the drum turning amount of the shift drum and of a detection value of the turning member turning-amount detection means and operational load calculation means for calculating an operational load inputted to the shift spindle on the basis of a calculated value of the opening angle calculation means.

According to an embodiment of the present invention, further including a clutch actuator adapted to cause the clutch to switch between engagement and disengagement and clutch operation controlling means for controlling operation of the clutch actuator so that the clutch is brought into a power interruption state when the calculated value of the operational load calculating means exceeds a predetermined value.

In addition, the main shaft 12 of the embodiment corresponds to the speed change input shaft of the invention, the cam shaft 13 of the embodiment corresponds to the change speed output shaft of the invention, the master arm 74 of the embodiment corresponds to the arm member of the invention, and the shift position sensor 102 of the embodiment corresponds to the drum turning amount detecting means of the present invention.

According to an embodiment of the present invention, the pressing portion projectingly provided on the turning member secured to the shift spindle is gripped by the gripping portions at both the ends of the lost motion spring. The arm member of the shift position changing driving means is provided with the pressure-receiving member which is gripped by both the gripping portions in such a manner that when the turning member is turned, if, in response to the turning direction, the pressing portion is abutted against one of both the gripping portions for turning, the other of the gripping portions is abutted against the pressure-receiving member. Thus, when the shift spindle is turned, the turning force of the turning member turning with the shift spindle is transmitted to the arm member of the shift position changing drive means via the lost motion spring. The turning member is precedently turned while leaving the arm member during the shifting operation with the clutch being in the power transmission state. If the shifting operation is stopped in midstream, the turning member and the shift spindle are returned to the original position by the spring force of the lost motion spring, thereby being prevented from coming into the neutral position. Even if a shifting operation load applied to the shift spindle is excessively large, it can partially be absorbed by the lost motion spring.

According to an embodiment of the present invention, the turning member turning-amount detection means for detecting the turning amount of the turning member is secured to the shift cover attached to the engine case to define the operational chamber between the engine case and the shift cover. The operational chamber accommodates a portion of the shift spindle, the turning member, the lost motion spring and the shift position changing drive means. Thus, the shifting operation can be detected from the start to the finish thereof by detecting the turning amount of the turning member.

According to an embodiment of the present invention, the opening angle between the arm member and the turning member is calculated on the basis of the detection value of the drum turning amount detecting means for detecting the turning amount of the shift drum and of the detection value of the turning member turning-amount detection means. In addition, the operating load inputted to the shift spindle can be calculated on the basis of the opening angle. Thus, the shift operational load can be calculated without use of an expensive load sensor.

According to an embodiment of the present invention, the operation of the clutch actuator adapted to cause the clutch to operatively switch between engagement and disengagement is controlled by the clutch operational controlling means so that the clutch may be brought into the power interruption state when the calculated value of the operational load calculation means exceeds a predetermined value. Thus, when the shift operational load exceeds the predetermined value, it is determined that it is intended to execute a shifting operation and the clutch is brought into the power interruption state, thereby making it possible to perform accurate shifting performance.

In view of the foregoing, it is an object of an embodiment of the present invention to provide a transmission for a vehicle that enhances maintenance performance for a shifting position sensor.

To achieve the above object, according to an embodiment of the present invention, a transmission for a vehicle includes a plurality of gear trains for respective speed steps accommodated in an engine case to enable selective establishment with a shift drum turnably carried by the engine case so as to selectively establish the gear trains in response to a turning position. A shifting position changing drive means covers one end of the shift drum so as to drivingly turn the shift drum in response to a shifting operation. A shifting position sensor for detecting which one of the gear trains is being established is provided. A to-be-detected member is connected to one end of the shift drum so as to be rotatable with the shift drum but to be incapable of relative rotation is turnably passed through an opening portion provided in the shifting position changing drive means and extends to a side opposite to the shift drum. The shifting position sensor, for detecting a turning operation amount of the to-be-detected member, is secured to the cover member mounted to an engine case so as to cover an external end of the to-be-detected member.

According to an embodiment of the present invention, the to-be-detected member, formed like a bar to extend in an axial direction of the shift drum, and the shift drum are arranged coaxially with each other.

According to an embodiment of the present invention, a speed reduction mechanism is interposed between the to-be-detected member and the shifting position sensor to reduce a turning operation amount of the to-be-detected member and transmit the turning operation amount reduced toward the shifting position sensor.

According to an embodiment of the present invention, a shift cover, which covers the shifting position changing means, is mounted to the engine case. The shifting position sensor, connected to a portion of the to-be-detected member projecting from the shift cover, is secured to an external surface of the cover member mounted to the shift cover so as to cover a portion of the shift cover.

The gear cover 67 of the embodiment corresponds to the cover member of the present invention.

According to an embodiment of the present invention, since the turning operation amount of the to-be-detected member turning together with the shift drum is detected by the shifting position sensor, the shifting position can be detected with good accuracy. Although the shifting position changing drive means covers one end of the shift drum, the to-be-detected member turnably passing through the opening portion provided in the shifting position changing drive means is connected to one end of the shift drum so as to be incapable of relative rotation and the shifting position sensor is secured to the outer surface of the cover member mounted to the engine case so as to cover the external end of the to-be-detected member. Thus, the shifting position sensor can be disposed externally of the engine case without making significant modifications to the design of the engine case and the shifting position changing drive means. This can enhance maintenance performance by eliminating the disassembly of the engine case at the time of maintaining the shifting position sensor. In addition, it is possible to reduce a thermal influence on the shifting position sensor from the engine side.

According to an embodiment of the present invention, since the bar-like to-be-detected member and the shift drum are arranged coaxially with each other, the opening area of the opening portion provided in the shifting position changing drive means can be reduced and the periphery of the shifting position sensor can be made compact.

According to an embodiment of the present invention, since the turning operation amount of the to-be-detected member turning together with the shift drum is reduced by the speed reduction mechanism and transmitted to the shifting position sensor, the small-sized and inexpensive shifting position sensor can be used.

According to an embodiment of the present invention, since the shifting position sensor is disposed externally of the engine case and of the shift cover, the thermal influence on the shifting position sensor from the engine can further be reduced. In addition, it is possible to further enhance the maintenance performance of the shifting position sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention will hereinafter be described with reference to the accompanying drawings.

Figure 1:
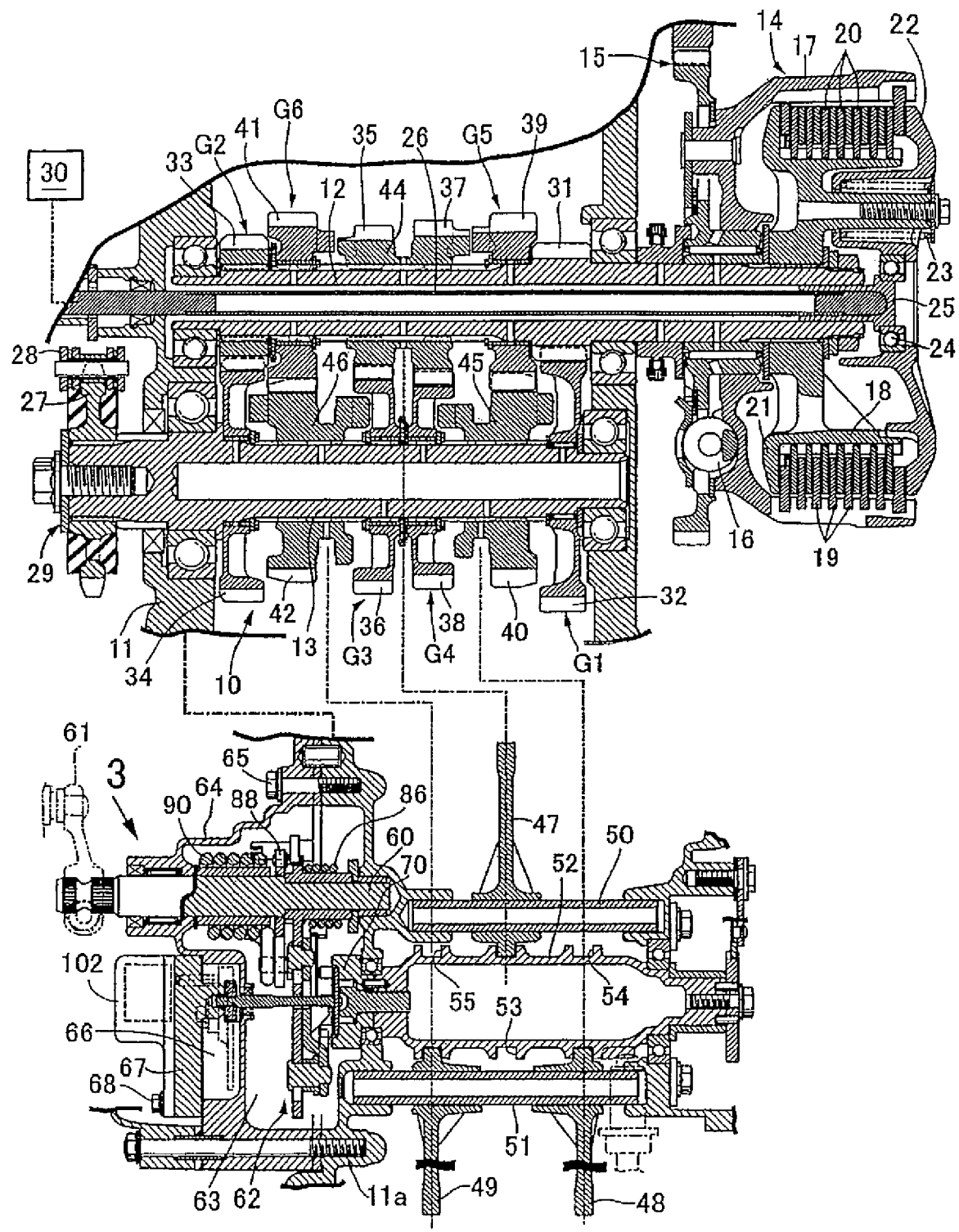
FIG. 1 is a longitudinal cross-sectional view of an essential portion of a transmission for a motorcycle.

FIGS. 1 through 11 illustrate one embodiment of the present invention. In FIG. 1, the transmission may be used with a motorcycle and includes a gear shifting mechanism 10 configured such that a plurality of speed steps, e.g., first through sixth speed gear trains G1, G2, G3, G4, G5 and G6 are provided between a main shaft 12 as a speed change input shaft and a counter shaft 13 as a speed change output shaft so as to enable selectable establishment. The main shaft 12 and the counter shaft 13 have respective axes parallel to each other and are rotatably journaled by an engine case 11. The first through sixth speed gear trains G1 through G6 are accommodated in the engine case 11.

A clutch 14 is provided between a crankshaft (not shown), a power source output shaft, of an engine and one end of the main shaft 12 to switch between connection and disconnection of power transmission. The clutch 14 includes a clutch outer 17, a clutch inner 18, a plurality of drive friction plates 19, a plurality of driven friction plates 20, a pressure-receiving plate 21, a pressurizing plate 22 and a clutch spring 23. The clutch outer 17 is adapted to receive power from the crankshaft via a first speed reduction device 15 and via a torque damper 16. The clutch inner 18 is disposed at the central portion of the clutch outer 17 and is joined to the main shaft 12 so as to be incapable of relative rotation. The drive friction plates 19 are spline-fitted to the inner circumferential wall of the clutch outer 17 so as to be axially slidable. The driven friction plates 20 are alternately superimposed on the drive friction plates 19 and spline-connected to the outer circumference of the clutch inner 18 so as to be axially slidable. The pressure-receiving plate 21 is integrally provided on the inner end of the clutch inner 18 so as to receive the innermost drive friction plate 19. The pressurizing plate 22 is slidably attached to the outer end of the clutch inner 18 so as to be able to push the outermost drive friction plate 19. The clutch spring 23 is adapted to bias the pressurizing plate 22 toward the pressure-receiving plate 21.

With such a clutch 14, if the drive friction plates 19 and driven friction plate 20 are gripped between the pressurizing plate 22 and the pressure-receiving plate 21 by the biasing force of the clutch spring 23, the clutch 14 is brought into a clutch-on state (the power transmission state) where the clutch outer 17 and the clutch inner are frictionally connected to each other.

A release member 25 is disposed at the central portion of the clutch inner 18 with a release bearing 24 interposed between the pressurizing plate 22 and the release member 25. A push rod 26 which is axially movably inserted into the main shaft 12 is connected to the release member 25. A clutch actuator 30, capable of providing a pressing force, is connected to the push rod 26. If the push rod 26 is pushed by the clutch actuator 30, the pressurizing plate 22 is moved rearwardly against the spring force of the clutch spring 23. This brings the drive friction plates 19 and the driven friction plates 20 into a free state. Thus, the clutch 14 is brought into a clutch-off state (the power interruption state) where the clutch outer 17 and the clutch inner 18 are not connected to each other.

The counter shaft 13 partially projects from the engine case 11 toward the side opposite to the clutch 14. A drive sprocket 27 is secured to the end portion of the countershaft 13 projecting from the engine case 11. The drive sprocket 27 constitutes part of the power transmission means 29 along with an endless chain 28 wound around the drive sprocket 27. The power outputted from the countershaft 13 is transmitted to a rear wheel not shown via the power transmission means 29.

The first speed gear train G1 is composed of a first speed drive gear 31 formed integrally with the main shaft 12 and a first speed driven gear 32 carried on the counter shaft 13 so as to be capable of relative rotation and meshing with the first speed drive gear 31. The second speed gear train G2 is composed of a second speed drive gear 33 carried on the main shaft 12 so as to be incapable of relative rotation and a second speed driven gear 34 meshing with the second speed drive gear 33 so as to be capable of relative rotation. The third speed gear train G3 is composed of a third speed drive gear 35 incapable of relative rotation with the main shaft 12 and a third speed driven gear 36 carried on the counter shaft 13 so as to be capable of relative rotation and meshing with the third speed drive gear 35. The fourth speed gear train G4 is composed of a fourth speed drive gear 37 incapable of relative rotation with the main shaft 12 and a fourth speed driven gear 38 carried on the counter shaft 13 so as to be capable of relative rotation and meshing with the fourth speed drive gear 37. The fifth speed gear train G5 is composed of a fifth speed drive gear 39 carried on the main shaft 12 so as to be capable of relative rotation therewith and a fifth speed driven gear 40 incapable of relative rotation with the counter shaft 13 and meshing with the fifth speed drive gear 39. The sixth speed gear train G6 is composed of a sixth speed drive gear 41 carried on the main shaft 12 so as to be capable of relative rotation and a sixth speed driven gear 42 being incapable of relative rotation with the counter shaft 13 and meshing with the sixth speed drive gear 41.

A fifth-sixth speed switching shifter 44 is axially slidably splined-fitted to the main shaft 12 between the fifth-speed drive gear 39 and the sixth speed drive gear 41. The third-speed drive gear 35 is formed integrally with the fifth-sixth switching shifter 44 so as to face the sixth speed drive gear 41. The fourth speed drive gear 37 is formed integrally with the fifth-sixth switching shifter 44 so as to face the fifth-speed drive gear 39. A first-fourth speed switching shifter 45 formed integrally with the fifth-speed driven gear 40 is axially slidably spline-fitted to the counter shaft 13 between the first speed driven gear 32 and the fourth speed driven gear 38. A second-third switching shifter 46 formed integrally with the sixth speed driven gear 42 is axially slidably spline-fitted to the counter shaft 13 between the second speed driven gear 34 and the third speed driven gear 36.

When the fifth-sixth speed switching shifter 44 is made to axially slide and engage the fifth-speed drive gear 39, the fifth-speed drive gear 39 is connected to the main shaft 12 via the fifth-sixth speed switching shifter 44 so as to be incapable of relative rotation, thereby establishing the fifth-speed gear train G5. When the fifth-sixth speed switching shifter 44 is made to axially slide and engage the sixth-speed drive gear 41, the sixth-speed drive gear 41 is connected to the main shaft 12 via the fifth-sixth speed switching shifter 44 so as to be incapable of relative rotation, thereby establishing the sixth-speed gear train G6.

When the first-fourth speed switching shifter 45 is made to axially slide and engage the first-speed drive gear 32, the first-speed driven gear 32 is connected to the counter shaft 13 via the first-fourth speed switching shifter 45 so as to be incapable of relative rotation, thereby establishing the first-speed gear train G1. When the first-fourth speed switching shifter 45 is made to axially slide and engage the fourth-speed driven gear 38, the fourth-speed driven gear 38 is connected to the counter shaft 13 via the first-fourth switching shifter 45 so as to be incapable of relative rotation, thereby establishing the fourth-speed gear train G4.

When the second-third speed switching shifter 46 is made to axially slide and engage the second-speed driven gear 34, the second-speed driven gear 34 is connected to the counter shaft 13 via the second-third speed shifter 46 so as to be incapable of relative rotation, thereby establishing the second speed gear train G2. When the second-third speed switching shifter 46 is made to axially slide and engage the third speed driven gear 36, the third speed driven gear 36 is connected to the counter shaft 13 via the second-third speed switching shifter 46 so as to be incapable of relative rotation, thereby establishing the third speed gear train G3.

The fifth-sixth switching shifter 44 is turnably held by a first shift fork 47. The first-fourth speed switching shifter 45 is turnably held by a second shift fork 48. The second-third speed switching shifter 46 is turnably held by the third shift fork 49. The first shift fork 47 has an axis parallel to the main shaft 12 and to the counter shaft 13 and is axially slidably supported by a first shift fork shaft 50 carried by the engine case 11. The second and third shift forks 48, 49 each have an axis parallel to the first shift fork shaft 50 and are axially slidably supported by a second shift fork shaft 51 carried by the engine case 11.

Figure 2:
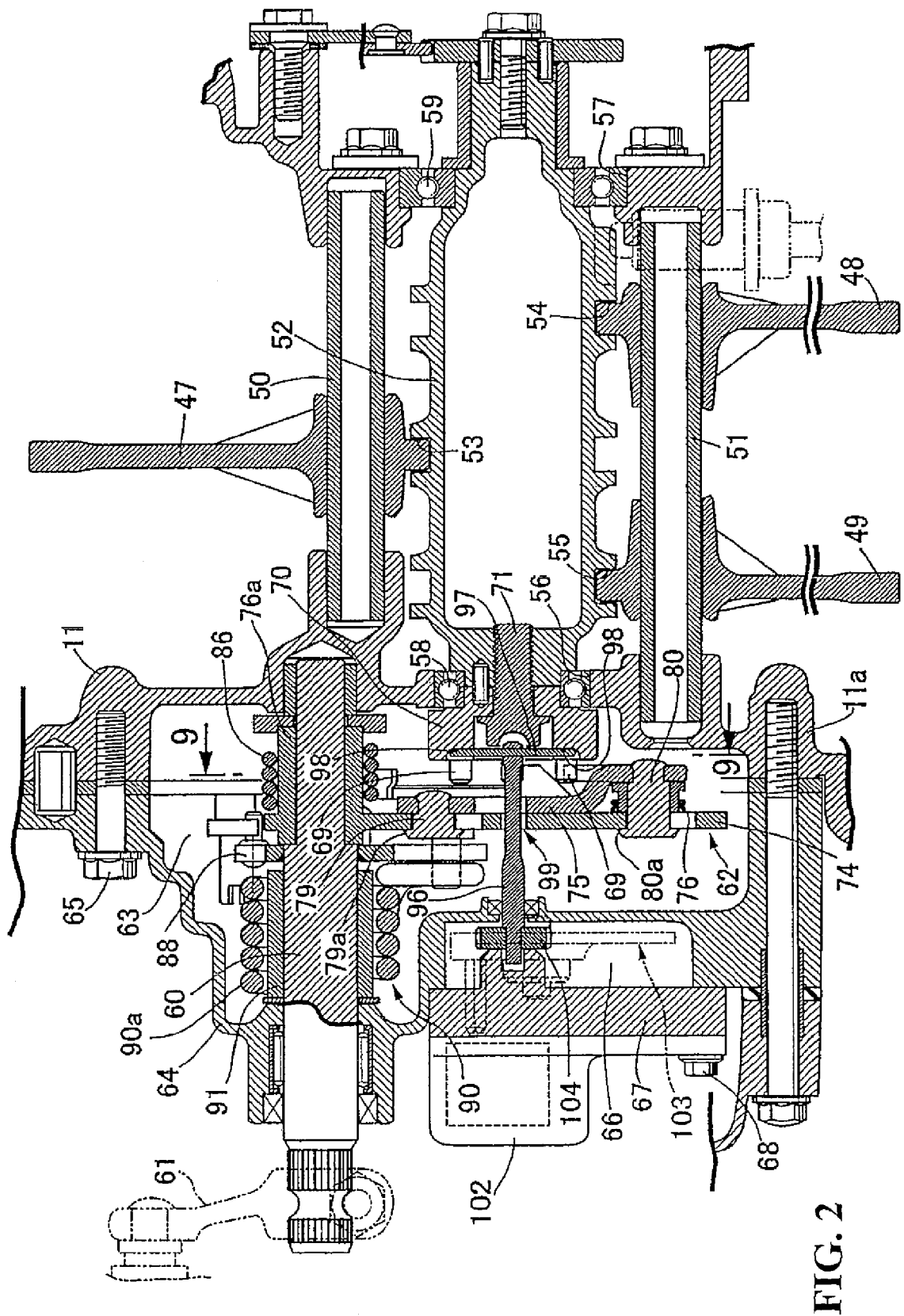
FIG. 2 is an enlarged cross-sectional view of FIG. 1, taken along line 2-2 of FIG. 4.

As illustrated in FIG. 2, a shift drum 52 having an axis parallel to the first and second shift forks 50, 51 is turnably supported by the engine case 11. The shift drum 52 is formed in an external surface with three engaging grooves 53, 54 and 55 with which the first, second and third shift forks 47, 48 and 49 are engaged, respectively. The engaging grooves 53, 54 and 55 are formed to determine the positions of the first through third shift forks 47, 48, 49 on the first and second shift fork shafts 50, 51 in response to the turning position of the shift drum 52. Turning the shift drum 52 selectively establishes the first through sixth speed gear trains G1 through G6 in response to the turning position thereof.

Both ends of the shift drum 52 are turnably passed through corresponding bearing holes 56, 57 provided in the engine case 11. Ball bearings 58, 59 are interposed between the inner circumference of the bearing holes 56, 57 and the shift drum 52.

The shift drum 52 is turnably driven by the operation of shifting position changing drive means 62, which is operable in response to the turn of a shift spindle 60 resulting from a shifting operation. A shift lever 61 is secured to one end of the shift spindle 60 having an axis parallel to the shift drum 52. The shift lever is interlocked with and connected to a change pedal (not shown).

Figure 3:
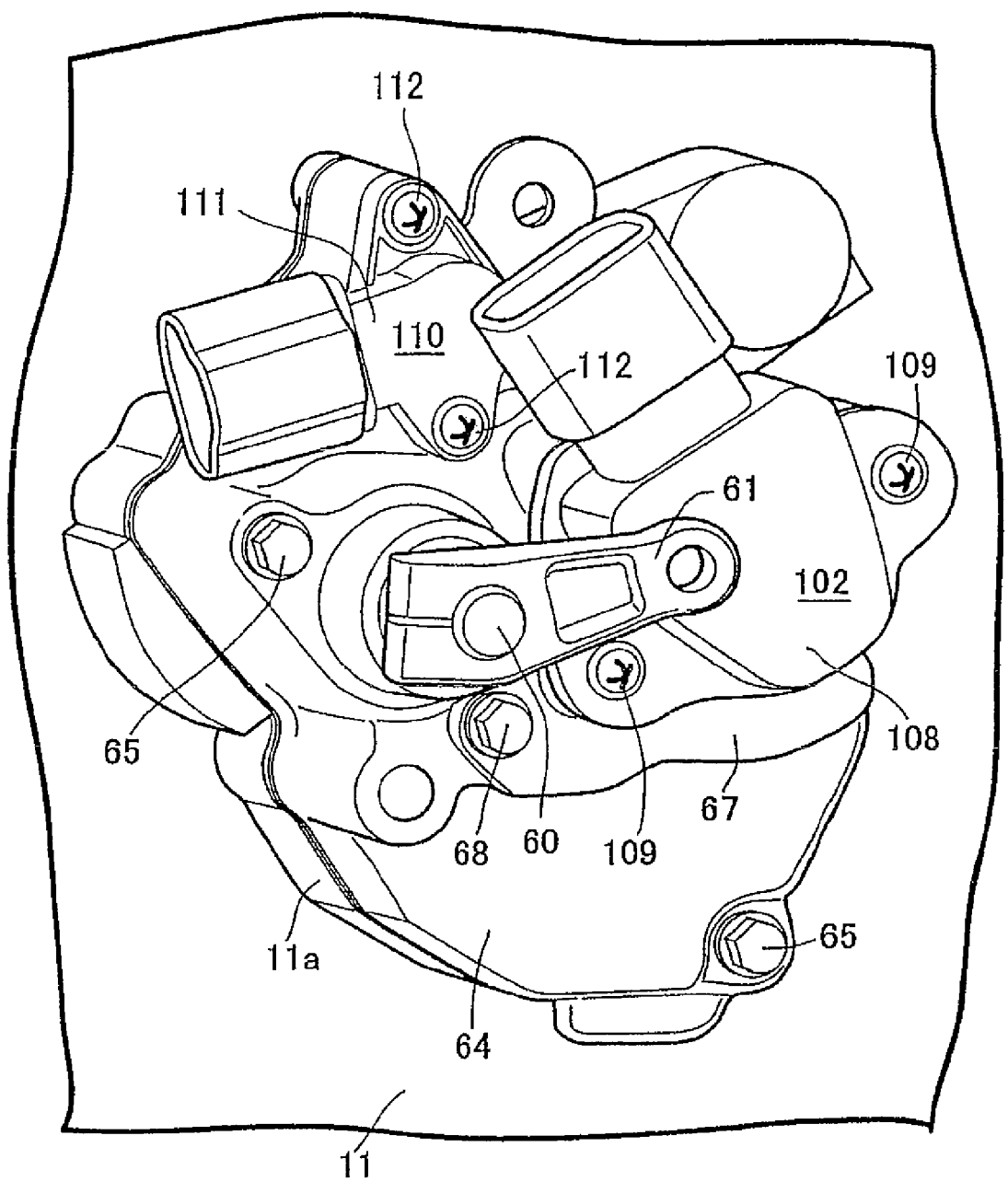
FIG. 3 is a perspective view as viewed from arrow 3 of FIG. 1.
Figure 4:
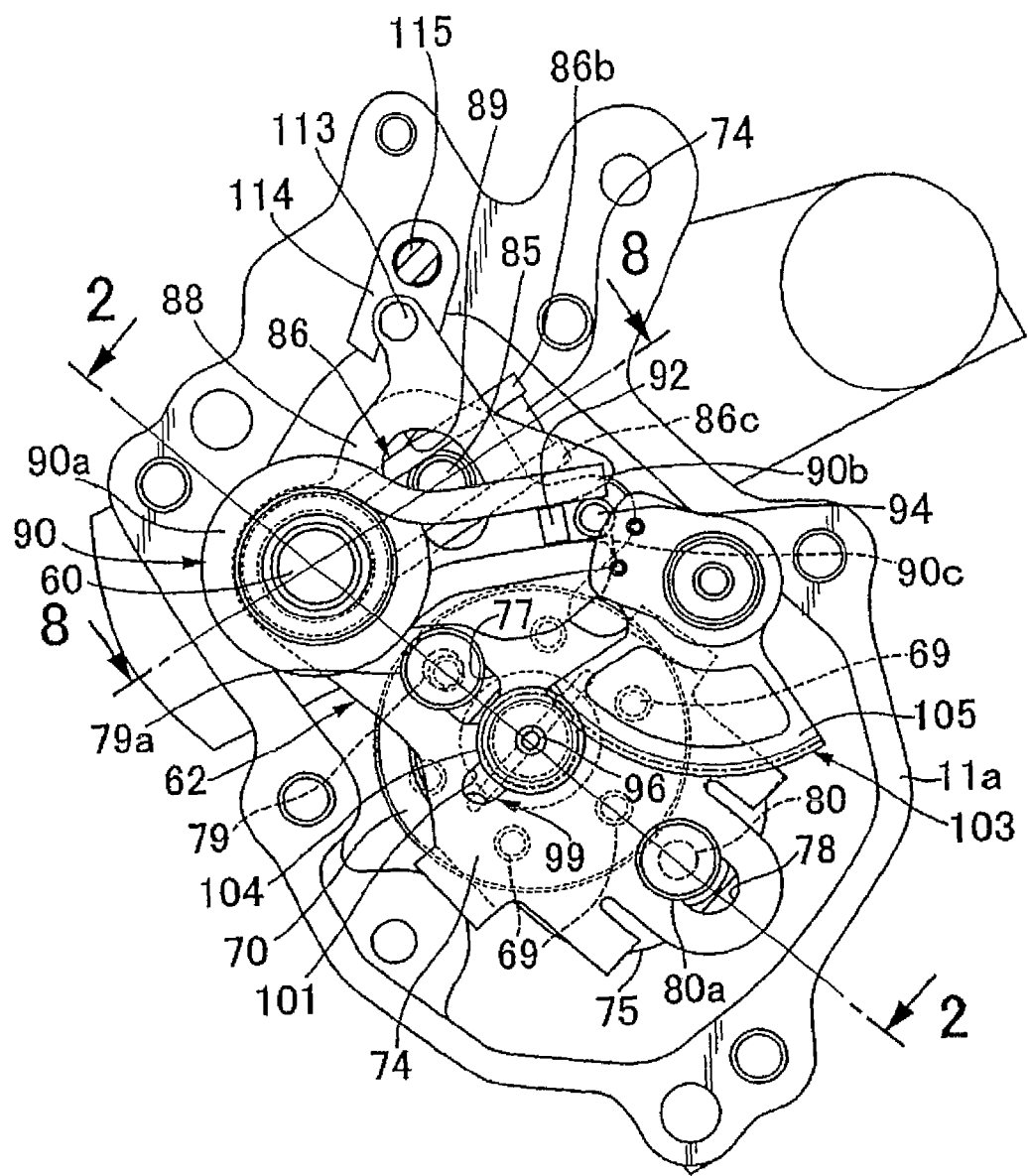
FIG. 4 illustrates the essential portion as viewed from arrow 4 of FIG. 2 with a shift cover and a gear cover removed.
Figure 5:
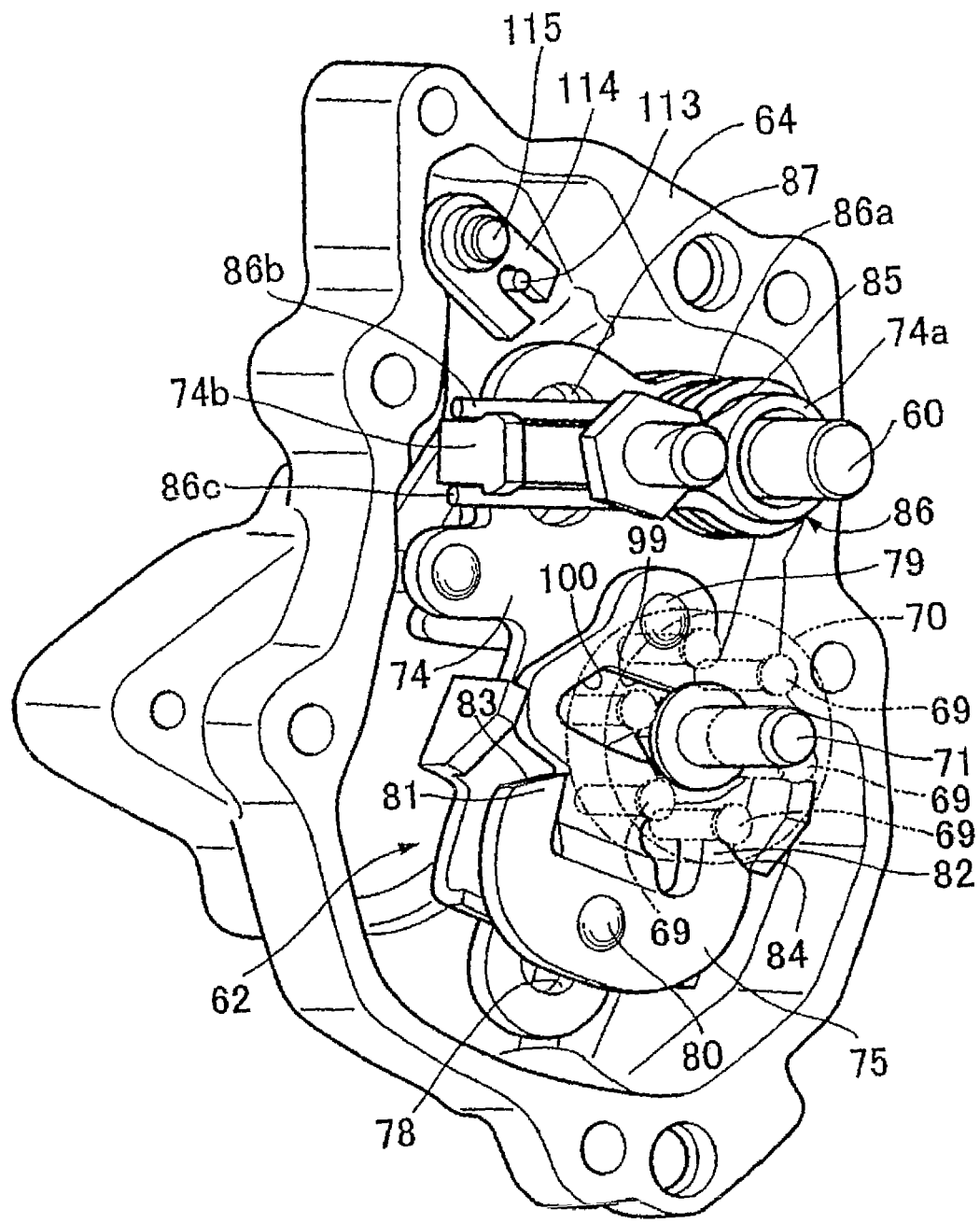
FIG. 5 is a perspective view illustrating the inside of the shift cover as viewed from the engine case side.
Figure 6:
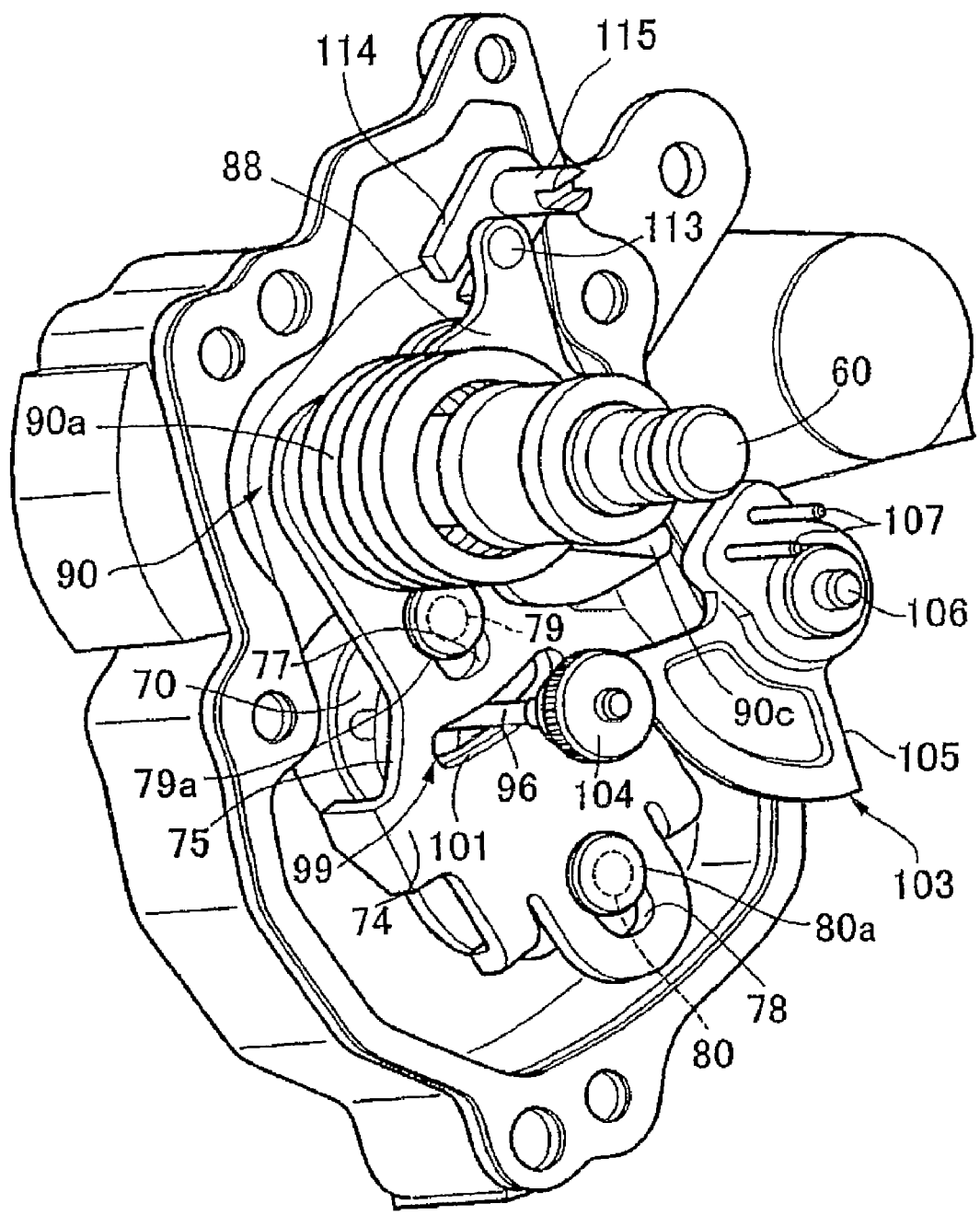
FIG. 6 is a perspective view illustrating the inside of the shift cover as viewed from the side opposite to the engine case with the gear cover removed.
Figure 7:
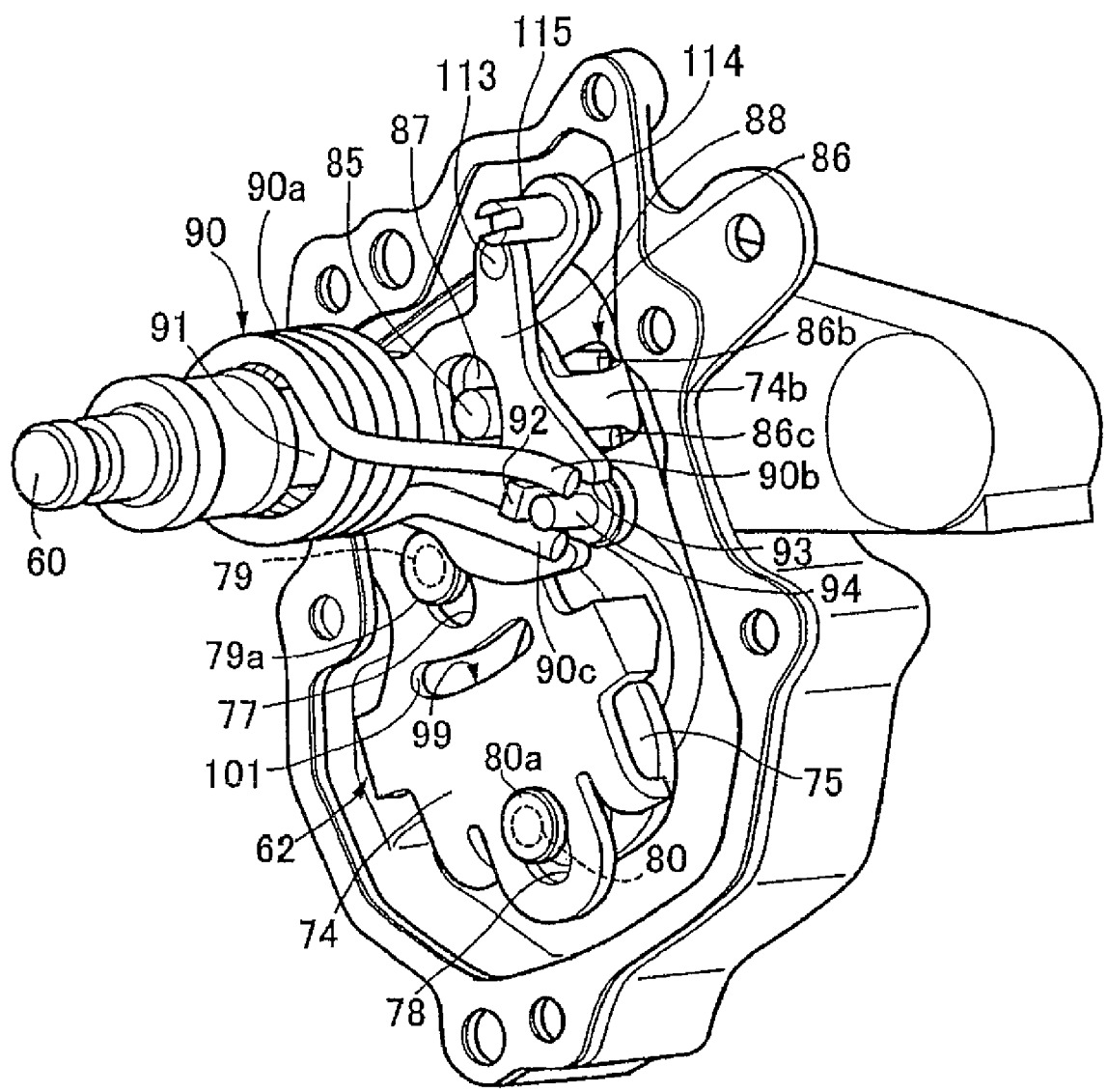
FIG. 7 is a perspective view illustrating the inside of the shift cover as viewed from the side opposite to the engine case in a direction different from that of FIG. 6 with a speed reduction mechanism removed.
Figure 8:
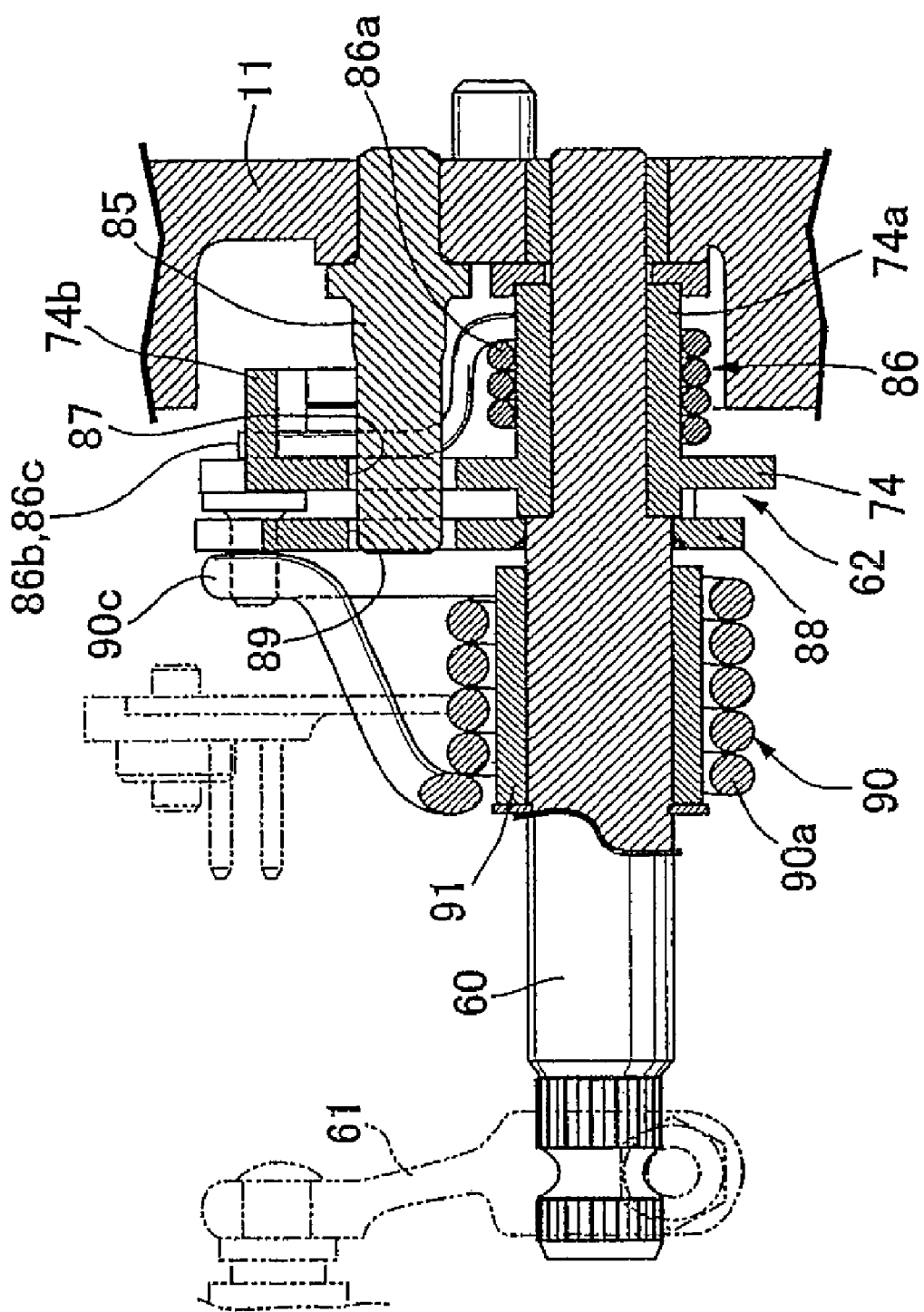
FIG. 8 is a cross-sectional view taken along line 8-8 of FIG. 4.
Figure 9:
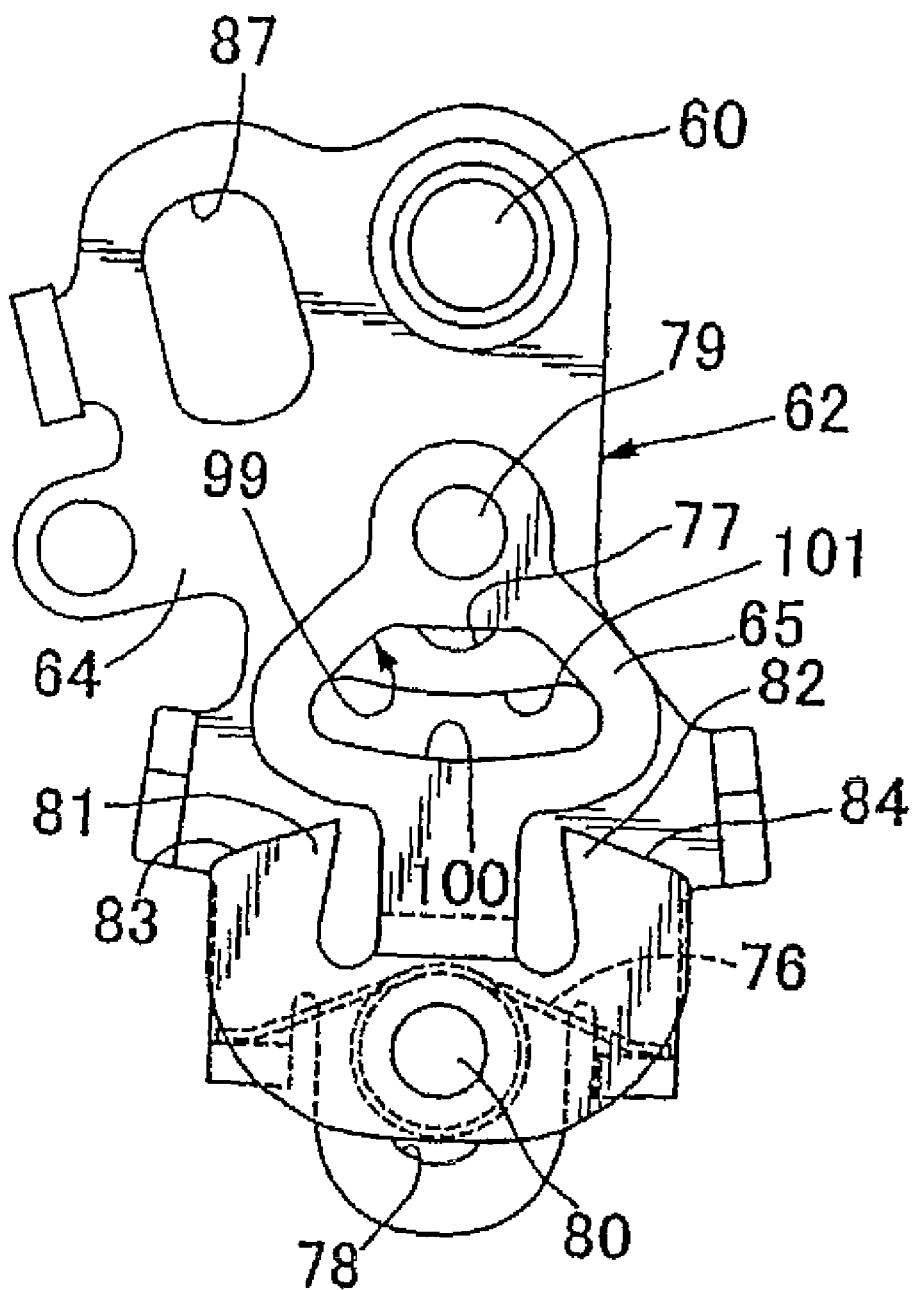
FIG. 9 illustrates shifting position change-drive means as viewed from the arrow direction of line 9-9 in FIG. 2.

As illustrated in FIG. 3, the engine case 11 is integrally provided with a wall portion 11a endlessly surrounding the shift spindle 60 and the shifting position changing drive means 62 on the one end side of the shift drum 52. A shift cover 64 is fastened to the wall portion 11a with a plurality of bolts 65 so as to define an operational chamber 63 between the engine case 11 and the shift cover 64. The operational chamber 63 is adapted to accommodate a portion of the shift spindle 60 and the shifting position changing drive means 62. The shift spindle 60 has one end which projects from the shift cover 64 that is turnably carried by the engine case 11 and by the shift cover 64. A gear cover 67 is fastened to the shift cover 64 with a plurality of bolts 68 so as to cover part of the shift cover 64 and to define a gear chamber 66 between the shift cover 64 and the gear cover 67.

A shift cam 70 is coaxially secured to one end of the shift drum 52 with a bolt 71 so as to face the operational chamber 53. The shift cam 70 is planted with follower pins 69 whose number is equal to that of the speed steps (six in the embodiment). The shifting position changing drive means 62 is disposed to cover one end of the shift drum 52 and the shift cam 70. In addition, the shifting position changing drive means 62 is configured to drivingly turn the shift drum 52 by being engaged with one of the follower pins 69 for turning therewith.

As illustrated in FIGS. 4 through 9, the shifting position changing drive means 62 includes a master arm 74, an arm 75 and a first return spring 76. The master arm 74 is turnably supported at one end by the shift spindle 60. The arm 75 is supported by the master arm 74 so as to enable a sliding operation in a limited range in the direction perpendicular to the axis of the shift spindle 60. The first return spring 76 is operative to bias the arm 75 to bring it close to the shift spindle 60.

The master arm 74 is provided at one end with a cylindrical support cylinder 74a surrounding the shift spindle 60. The support cylinder 74a is turnably supported by the shift spindle 60. The master arm 74 is formed with a pair of guide holes 77, 78 which are located on a straight line passing the axis of the shift spindle 60 so as to be spaced apart from each other. The guide holes 77, 78 are each formed like an oblong hole extending along the straight line. Pins 79 and 80 are secured at one end to the arm 75 disposed between the master arm 74 and the shift cam 70 so as to be inserted into a corresponding one of the guide holes 77 and 78, respectively. In addition, the pins 79 and 80 are integrally provided at the other ends with flange portions 79a and 80a, respectively, which protrude radially outwardly so as to be in slidable contact with the surface opposite to the arm 75 of the master arm 74. In this way, the arm 75 is supported by the master arm 74 so as to enable a sliding operation in a range where the pins 79 and 80 are movable within the guide holes 77 and 78, respectively, in the direction perpendicular to the axis of the shift spindle 60. The first return spring 76 is disposed to surround the pin 80. The first return spring 76 abuts both ends against the end of the master arm 74 on the side opposite to the shift spindle 60 so that the arm 75 is spring-biased to the side close to the shift spindle 60.

The arm 75 is formed with a pair of engaging claws 81, 82 at ends on the side opposite to the shift spindle 60. The arm 75 may be located at a position closest to the shift spindle 60 by the spring force of the first returning spring 76. In such a case, the engaging claws 81, 82 are each engageable from the outside with a corresponding one of circumferentially adjacent two follower pins 69 of the follower pins 69 provided on the shift cam 70. In this state, if the master arm 74 is turned to one side around the axis of the shift spindle 60, one of both the engaging claws 81, 82 is engaged from the outside with one follower pin 69 and drivingly turns the shift cam 70, i.e., the shift drum 52 but the other will not engage the follower pin 69.

The engaging claws 81 and 82 are formed with slant surfaces 83 and 84, respectively, on respective lateral surfaces on the side of the shift spindle 60. The slant surfaces 83, 84 are slanted to be away from the spindle 60 as they go toward the outside. In the state where e.g. one engaging claw 81 of the engaging claws 81, 82 drivingly turns the shift drum 52 by a predetermined turning amount, the next follower pin 69 is moved to the position of the follower pin 69 engaged with the engaging claw 81. Thus, when the arm 75 is turned and returned toward the original position along with the master arm 74, the next follower pin 69 comes into abutment against the slant surface 83 to move the arm 75 against the spring force of the first return spring 76 so as to be away from the shift spindle 60. This causes the engaging claw 81 to go over the next follower pin 69. Also e.g. the other engaging claw 82 of the engaging claws 81, 82 may drivingly turn the shift drum 52 by a predetermined turning amount. In such a case, similarly to the above, when the arm 75 is turned and returned toward the original position along with the master arm 74, the next follower pin 69 is abutted against the slant surface 84 to move the arm 75 against the spring force of the first return spring 76 so as to be away from the shift spindle 60. This causes the engaging claw 82 to go over the next follower pin 69.

The master arm 74 is provided near the shift spindle 60 with a circular arc restriction hole 87 with the center on the axis of the shift spindle 60. The stopper pin planted on the engine case 11 is inserted into the restriction hole 87. Thus, the turning range of the master arm 74 around the axis of the shift spindle 60 is restricted by the stopper pin 85 that comes into abutment against both circumferential ends of the restriction hole 87.

The master arm 74 is biased by a second return spring 86 to return to the original position, a neutral position. The second return spring 86 is integrally provided with gripping portions 86b, 86c at both ends of a coil portion 86a. The coil portion 86a surrounds the support cylinder 74a provided on the master arm 74 to surround the shift spindle 60b. The gripping portions 86b, 86c are adapted to grip the stopper pin 85 from both sides. The master arm 74 is integrally provided with an engaging portion 74b disposed outward of the stopper pin 85 and between both the gripping portions 86b, 86c.

In this way, if the master arm 74 is turned around the axis of the shift spindle 60, the engaging portion 74b of the master arm 74 abuts against and is engaged with one of the gripping portions 86b, 86c to leave the other of the gripping portions 86b, 86c by being brought into abutment against the stopper pin 85 and to turn one of the gripping portions while bending it to be away from the stopper pin 85. If the load applied to the master arm 74 is released, the master arm 74 is returned by the spring force of the bent gripping portion of both the gripping portions 86b, 86c to the neutral position where the engaging portion 74b is located externally of the stopper pin 85.

A turning member 88 facing the master arm 74 is secured to the shift spindle 60 at a position where a portion of the master arm 74 close to the shift spindle 60 is put between the arm 75 and the turning member 88. This turning member 88 is formed with a circular arc restriction hole 89 with the center placed on the axis of the shift spindle 60 so as to receive the outer end of the stopper pin 85 inserted thereinto.

A lost motion spring 90 is disposed between the master arm 74 of the shifting position changing means 62 and the turning member 88. This lost motion spring 90 is provided with gripping portions 90b, 90c at both ends of a coil portion 90a. The coil portion 90a surrounds a cylindrical sleeve 91 into which the shift spindle 60 is inserted. The gripping portions 90b, 90c grip from both sides a pressing portion 92 provided to project from the turning member 88. The master arm 74 is provided with a pin 94 serving as a pressure-receiving portion gripped by both the gripping portions 90b, 90c. The pressing portion 92 is formed by partially cutting and raising the outer circumference of the turning member 88 so as to form a recessed portion 93 at which the pin 94 is disposed.

With such a lost motion spring 90, when the turning member 88 is turned, if, in response to the turning direction, the pressing portion 92 abuts against one of the gripping portions 90b, 90c, the other of the gripping portions 90b, 90c abuts against the pin 94 in the same turning direction as that of the pressing portion 92. The turning of the shift drum 52 may be restrained by the friction resulting from engine torque encountered when the clutch 14 is in the power transmission state. In such a case, since also the turning of the master arm 74 is restrained, the turning member 88 is turned to leave the master arm 74 while the gripping angle of the gripping portions 90b, 90c, i.e., the opening angle between the turning member 88 and the master arm 74 is increased. Thus, the spring biasing force is applied between the master arm 74 and the turning member 88 so as to reduce the opening angle therebetween.

A bar-like to-be-detected member 96 extending in the axial direction of the shift drum 52 is joined to one end of the shift drum 52 so as to be coaxial therewith and to be incapable of relative rotation. More specifically, an engaging pin 97 is orthogonally inserted into one end of the to-be-detected member 96. The shift cam 70 secured to the one end of the shift drum 52 is formed with fitting grooves 98, 98 adapted to receive both ends of the engaging pin 97 fitted thereto.

The other end of the to-be-detected member 96 extends toward the side opposite to the shift drum 52 and turnably passes through an opening portion 99 provided in the shifting position changing drive means 62. This opening portion 99 includes a first through-hole 100 and a second through-hole 101. The first through-hole 100 is provided in the arm 75 of the shifting position changing drive means 62, whereas the second through-hole 101 is provided in the master arm 74 of the shifting position changing drive means 62. The first through-hole 100 is formed so that the arm 75 may turn with the master arm 74 and the master arm 74 does not come into contact with the to-be-detected member 96 when the arm 75 operatively slides with respect to the master arm 74. The second through-hole 101 is formed so that the master arm 74 may not come into contact with the to-be-detected member 96 when the master arm 74 turns around the axis of the shift spindle 60.

The shift cover 64 is fastened to the wall portion 11a of the engine case 11 to define the operational chamber 63 between the engine case 11 and the shift cover 64. The operational chamber 63 is adapted to accommodate a portion of the shift drum 60, the shifting position changing drive means 62, the first return spring 76, the turning member 88 and the lost motion spring 90. The to-be-detected member 96 turnably passes through the shift cover 64 at a position corresponding to the gear chamber 66 defined between the shift cover 64 and the gear cover 67 fastened to the shift cover 64. In addition, the other end, i.e., the outer end, of the to-be-detected member 96 is covered by and turnably carried by the gear cover 67.

A shifting position sensor 102, adapted to detect the shift-turning position of the shift drum 52, is secured to the outer surface of the gear cover 67 so as to detect the turning amounts of the to-be-detected member 96 and the shift drum 52. A speed reduction mechanism 103 is interposed between the portion of the to-be-detected member 96 projecting from the shift cover 64 and the shifting position sensor 102. This speed reduction mechanism 103 reduces the turn-operation amount of the to-be-detected member 96 and transmits it to the shifting position sensor 102. The speed reduction mechanism 103 is accommodated in the gear chamber 66.

Figure 10:
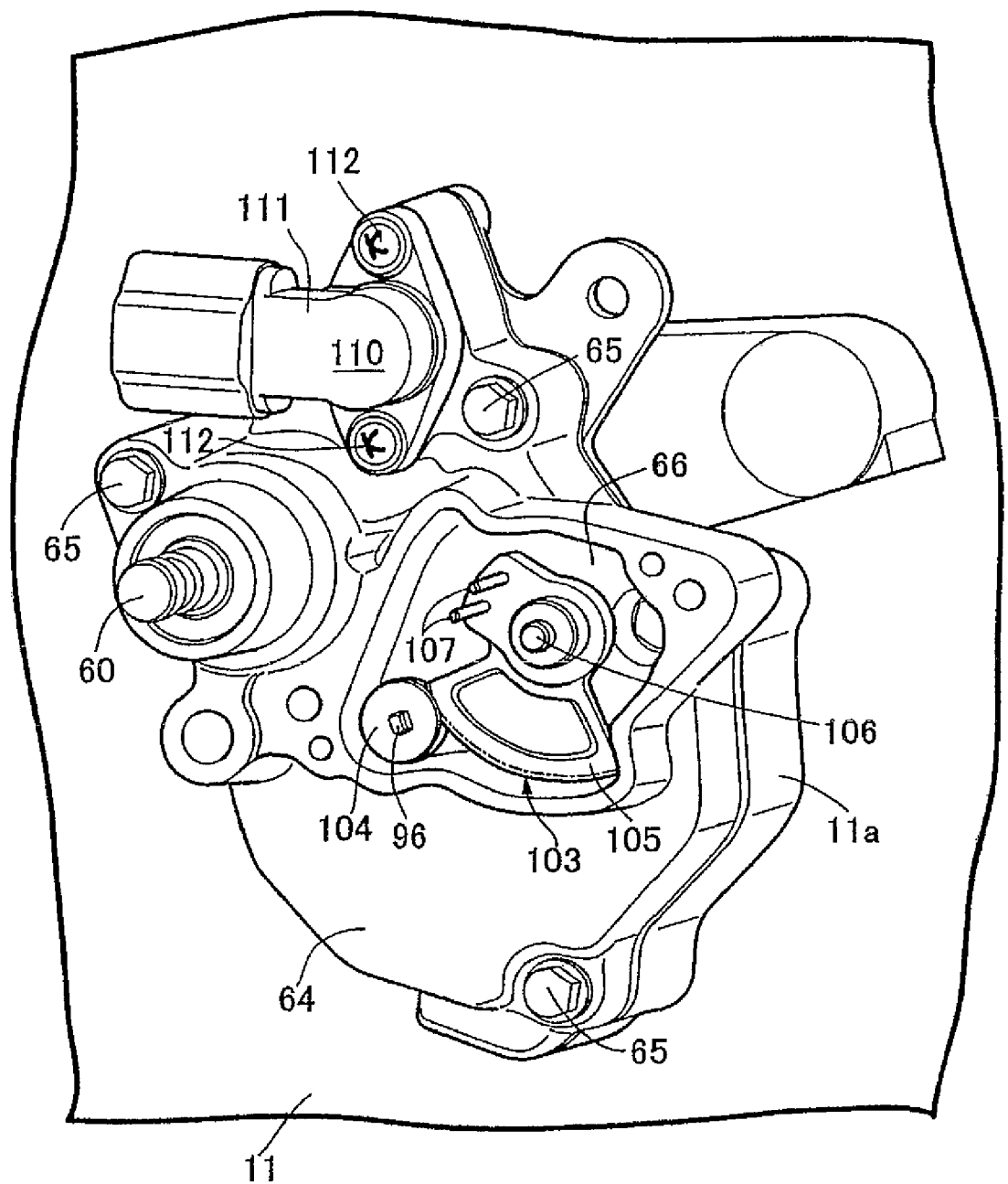
FIG. 10 is a perspective view illustrating the inside of a gear chamber with a gear cover removed from the shift cover.

As illustrated in FIG. 10, the speed reduction mechanism 103 includes a drive gear 104 which is fitted to the to-be-detected member 96 so as to be incapable of relative rotation and is put between the shift cover 64 and the gear cover 67 and a sector gear 105 meshing with the drive gear 104. The sector gear 105 is turnably carried by the shift cover 64 via a shaft 106 having an axis parallel to the to-be-detected member 96.

The sector gear 105 is provided with a pair of engaging pins 107, 107 at a position offset from the turning axis thereof. The shifting position sensor 102 has a detecting portion (not shown) gripped between the engaging pins 107, 107. A sensor case 108 for the shifting position sensor 102 is fastened to the gear cover 67 with a plurality of screw members 109.

Turning member turning-amount detecting means 110 is attached to the shift cover 64 to detect the turning amount of the turning member 88. A case 111 for the turning member turning-amount detecting means 110 is fastened to the shift cover 64 with a plurality of screw members 112.

A pin 113 is planted on the turning member 88 at a position offset from the shift spindle 60. An operating member 114 is engaged at one end with the pin 113 at one end and provided with a shaft 115 at the other end. This shaft is engaged with a detection portion (not shown) of the turning member turning-amount detecting means 110 so as to be incapable of relative rotation.

Figure 11:
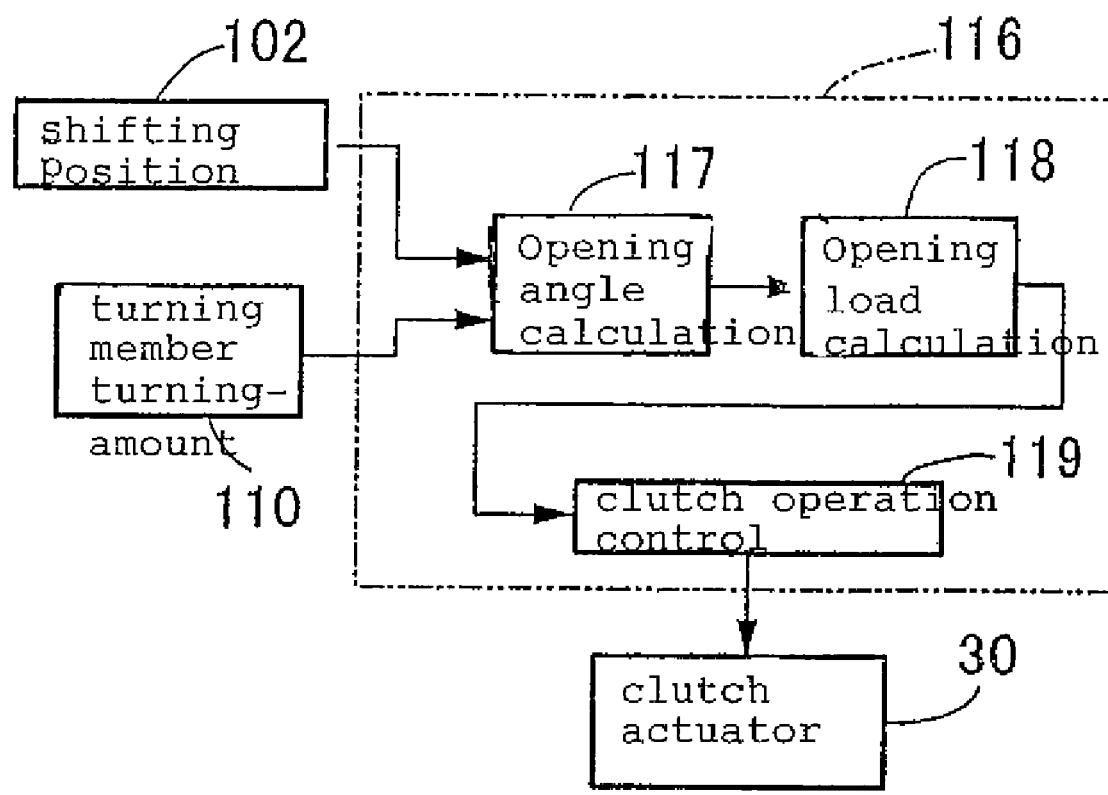
FIG. 11 is a block diagram illustrating a configuration of a control system adapted to control the operation of a clutch actuator.

Referring to FIG. 11, the operation of the clutch actuator 30 is controlled by a control unit 116. The control unit 116 is adapted to receive the turning amount of the shift drum 52 detected by the shifting position sensor 102 and the turning amount of the turning member 88 detected by the turning member turning-amount detecting means 111.

The control unit 116 includes opening angle calculation means 117, operating load calculation means 118 and clutch operational controlling means 119. The opening angle calculation means 117 calculates the opening angle between the master arm 74 and turning member 88 of the shifting position changing drive means 62 on the basis of the turning amount of the shift drum 52 detected by the shifting position sensor 102 and of the turning angle amount of the turning member 88 detected by the turning member turning-amount detecting means 111. The operating load calculating means 118 calculates the operating load inputted to the shift spindle 60 on the basis of the calculated value of the opening angle calculation means 117. The clutch operational controlling means 119 controls the operation of the clutch actuator 30 so that the clutch 14 is brought into a power interruption state when the calculated value of the operating value calculating means 118 exceeds a predetermined value.

A description is next given of the operation of the embodiment. The to-be-detected member 96 is connected to one end of the shift drum 52 so as to be rotatable with the shift drum 52 but to be incapable of relative rotation. In addition, the to-be-detected member 96 is rotatably passed through the opening portion 99 provided in the shifting position changing drive means 62 and extends to the side opposite to the shift drum 52. The shifting position sensor 102 for detecting the turning operation amount of the to-be-detected member 96 is secured to the outer surface of the gear case 67 mounted to the engine case 11 so as to cover the external end of the to-be-detected member 96. The shifting position sensor 102 detects the turning operation amount of the to-be-detected member 96 turning together with the shift drum 52. Thus, the shifting position can be detected with good accuracy. Although the shifting position changing drive means 62 covers one end of the shift drum 52, the to-be-detected member 96 is turnably passed through the opening portion 99 provided in the shifting position changing drive means 62 and the shifting position sensor 102 is secured to the outer surface of the gear member 67 covering the external end of the to-be -detected member 96. Thus, the shifting position sensor 102 can be disposed externally of the engine case 11 without making significant changes to the design of the engine case 11 and the shifting position changing drive means 62. This enhances maintenance performance by eliminating the disassembly of the engine case 11 during the maintenance of the shifting position sensor 102. In addition, it is possible to reduce a thermal influence on the position sensor 102 from the engine side.

The to-be-detected member 96 is formed like a bar to extend in the axial direction of the shift drum 52 and is arranged coaxially with the shift drum 52. Thus, it is possible to reduce the opening area of the opening portion 99 provided in the shifting position changing drive means 62 and to make the periphery of the shifting position sensor 102 compact.

The speed reduction mechanism 103 which reduces the turning operation amount of the to-be-detected member 96 and transmits it toward the shifting position sensor 102 is interposed between the to-be-detected member 96 and shifting position sensor 102. Thus, it is possible to use the shifting position sensor 102 that has a narrow detection range and is small-sized and inexpensive.

The shift cover 64 covering the shifting position changing means 62 is mounted to the engine case 11 and the shifting position sensor 102 is secured to the outer surface of the gear cover 67 mounted to the shift cover 64 so as to cover part of the shift cover 64. Thus, the shifting position sensor 102 is disposed externally of the engine case 11 and of the shift cover 64. This further reduces the thermal influence on the shifting position sensor 102 and can further enhance the maintenance performance of the shifting position sensor 102.

The turning member 88 projectingly provided with the pressing portion 92 is secured to the shift spindle 60. The lost motion spring 90 is disposed between the master arm 74 of the shifting position changing drive means 62 and the turning member 88. The lost motion spring 90 is provided with the gripping portions 90b, 90c at both the ends of the coil portion 90a surrounding the shift spindle 60 with the gripping portions 90b, 90c gripping the pressing portion 92 from both sides. The master arm 74 is provided with the pin 94 gripped by both the gripping portions 90b, 90c in such a manner that when the turning member 88 is turned, if, in response to the turning direction, the pressing portion 92 abuts against one of the gripping portions 90b, 90c with the other of the gripping portions 90b, 90c abutting against the pin 94.

In this way, when the shift spindle 60 is turned, the turning force of the turning member 88 turning with the shift spindle 60 is transmitted to the master arm 74 of the shifting position changing drive means 62 via the lost motion spring 90. During the shift operation in the power transmission state of the clutch 14, the turning member 88 is precedently turned while leaving the master arm 74. If the shift operation is stopped in midstream, the turning member 88 and the shift spindle 60 are returned to the respective original positions by the spring force of the lost motion spring 90. Thus, it is possible to prevent the shift drum 52 from remaining unchanged at the neutral position. Even if the shift operational load to be applied to the shift spindle 60 is excessively large, it can partially be absorbed by the lost motion spring 90.

The shift cover 64 is mounted to the engine case 11 to define the operational chamber 63 between the engine case 11 and the shift cover 64. The operational chamber 63 accommodates a portion of the shift spindle 60, the turning member 88, the lost motion spring 90 and the shifting position changing drive means 62. The turning member turning-amount detecting means 110 for detecting the turning amount of the turning member 88 is secured to the shift cover 64. Thus, the shift operation can accurately be detected from the beginning to end thereof by detecting the turning amount of the turning member 88.

The opening angle between the master arm 74 and the turning member 88 can be calculated by the opening angle calculation means 117 on the basis of the detected value of the shifting position sensor 102 for detecting the turning amount of the shift drum 52 and of the detected value of the turning member turning-amount detecting member 110. In addition, the operational load inputted to the shift spindle 60 can be calculated by the operational load calculating means 118 on the basis of the calculation value of the opening angle calculating means 117. Thus, the shift operational load can be calculated without use of an expensive load sensor.

The clutch actuator 30 which operatively switches between the engagement and disengagement of the clutch 14 is operatively controlled by the clutch operational controlling means 119 so that the clutch 14 may be brought into a power interruption state when the calculated value of the operational load calculating means 118 exceeds the predetermined value. Thus, when the shift operational load exceeds the predetermined value, it is determined that a shift operation is intended and the clutch 14 is brought into the power interruption state, thereby executing the reliable shifting operation.

While the embodiment of the present invention has been made thus far, the invention is not limited to the embodiment described above. Design modifications can be made in various ways without departing from the invention described in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a vehicle, comprising:
   a gear shifting mechanism in which a plurality of selectively establishable gear trains for respective speed steps are provided between a speed change input shaft and a speed change output shaft;
   a clutch adapted to switch between connection and disconnection of power transmission between a power source output shaft and the speed change input shaft;
   a shift drum turnably carried by an engine case so as to selectively establish the gear trains in response to a turning position;
   a shift spindle turnably attached to the engine case so as to turn in response to a shifting operation;
   shifting position changing drive means having an arm member being capable of turning around an axis of the shift spindle for enabling to drivingly turn the shift drum in response to turning of the shift spindle;
   a turning member secured to the shift spindle and projectingly provided with a pressing member;
   a lost motion spring in which gripping portions gripping the pressing portion from both sides are provided at both sides of a coil portion surrounding the shift spindle;
   wherein the arm member is provided with a pressure-receiving member which is gripped by both the gripping portions in such a manner that when the turning member is turned, if, in response to the turning direction, the pressing portion abuts against one of both the gripping portions for turning, the other of the gripping portions abuts against the pressure-receiving member;
   a shift cover mounted to the engine case to define an operational chamber between the engine case and the shift cover, the operational chamber accommodating a portion of the shift spindle, the turning member, the lost motion spring and the shift position changing drive means; and
   a turning member turning-amount detecting means for detecting a turning amount of the turning member, said turning member turning-amount detecting means being secured to the shift cover.

2. The transmission for the vehicle according to claim 1, and further comprising:
   drum turning amount detecting means for detecting the turning amount of the shift drum;
   opening angle calculating means for calculating an opening angle between the arm member and the turning member on the basis of a detection value of the drum turning amount detecting means and of a detection value of the turning member turning-amount detection means; and
   operational load calculation means for calculating an operational load inputted to the shift spindle on the basis of a calculated value of the opening angle calculation means.

3. The transmission for the vehicle according to claim 2, and further comprising:
a clutch actuator adapted to cause the clutch to switch between engagement and disengagement; and
clutch operational controlling means for controlling operation of the clutch actuator so that the clutch is brought into a power interruption state when the calculated value of the operational load calculating means exceeds a predetermined value.

4. The transmission for the vehicle according to claim 1, wherein the arm member is provided at one end with a cylindrical support cylinder surrounding the shift spindle.

5. The transmission for the vehicle according to claim 4, wherein the arm member is formed with a pair of guide holes located on a straight line passing the axis of the shift spindle so as to be spaced apart from each other with the guide holes each being formed like an oblong hole extending along the straight line.

6. The transmission for the vehicle according to claim 5, and further including pins secured at ends of the master arm member and each of said guide pins having a proximal end disposed between the arm member and the shift cam for insertion into corresponding guide holes and each of said guide pins having a distal end with flange portions protruding radially outwardly therefrom for slidably contacting the surface opposite to the arm member.

7. The transmission for the vehicle according to claim 6, wherein the arm member is slidable in a range wherein the pins are movable within the guide holes in a direction substantially perpendicular to the axis of the spindle shaft.

8. The transmission for the vehicle according to claim 4, and further including a second arm disposed to be adjacent to said arm member, said second arm including engaging claws at an end opposite to the shift spindle, said engaging claws being engagable from the outside with a corresponding follower pin provided on a shift cam, said engaging claws selectively imparting movement to said shift cam for imparting movement to said shift drum.

9. The transmission for the vehicle according to claim 1, and further including a shift position sensor for detecting the shift-turning position of the shift drum, said shifting position sensor being secured to an outer surface of a gear cover for detecting the turning amounts of a to-be-detected member and the shift drum and a speed reduction mechanism being interposed between the portion of the to-be-detected member projecting from the shift cover and the shifting position sensor, said speed reduction mechanism reduces a turn-operation amount of the to-be-detected member and transmits the turn-operation amount to the shift position sensor.

10. A transmission for a vehicle, comprising:
a plurality of gear trains for respective speed steps accommodated in an engine case to enable selective establishment;
a shift drum turnably carried by the engine case so as to selectively establish the gear trains in response to a turning position;
shifting position changing drive means covering one end of the shift drum so as to drivingly turn the shift drum in response to shifting operation; and
a shifting position sensor for detecting which one of the gear trains is being established;
wherein a to-be-detected member connected to one end of the shift drum so as to be rotatable with the shift drum but to be incapable of relative rotation is turnably passed through an opening portion provided in the shifting position changing drive means and extends to a side opposite to the shift drum; and
the shifting position sensor for detecting a turning operation amount of the to-be-detected member is secured to a cover member mounted to the engine case so as to cover an external end of the to-be-detected member.

11. The transmission for the vehicle according to claim 10, wherein the to-be-detected member formed like a bar to extend in an axial direction of the shift drum and the shift drum are arranged coaxially with each other.

12. The transmission for the vehicle according to claim 10, wherein a speed reduction mechanism is interposed between the to-be-detected member and the shifting position sensor to reduce a turning operation amount of the to-be-detected member and transmit the turning operation amount reduced toward the shifting position sensor.

13. The transmission for the vehicle according to claim 11, wherein a speed reduction mechanism is interposed between the to-be-detected member and the shifting position sensor to reduce a turning operation amount of the to-be-detected member and transmit the turning operation amount reduced toward the shifting position sensor.

14. The transmission for the vehicle according to claim 10, wherein a shift cover covering the shifting position changing means is mounted to the engine case;
the shifting position sensor connected to a portion of the to-be-detected member projecting from the shift cover is secured to an external surface of the cover member mounted to the shift cover so as to cover a portion of the shift cover.

15. The transmission for the vehicle according to claim 11, wherein a shift cover covering the shifting position changing means is mounted to the engine case;
the shifting position sensor connected to a portion of the to-be-detected member projecting from the shift cover is secured to an external surface of the cover member mounted to the shift cover so as to cover a portion of the shift cover.

16. The transmission for the vehicle according to claim 12, wherein a shift cover covering the shifting position changing means is mounted to the engine case;
the shifting position sensor connected to a portion of the to-be-detected member projecting from the shift cover is secured to an external surface of the cover member mounted to the shift cover so as to cover a portion of the shift cover.

17. The transmission for the vehicle according to claim 13, wherein a shift cover covering the shifting position changing means is mounted to the engine case;
the shifting position sensor connected to a portion of the to-be-detected member projecting from the shift cover is secured to an external surface of the cover member mounted to the shift cover so as to cover a portion of the shift cover.

18. The transmission for the vehicle according to claim 10, and further including a speed reduction mechanism being interposed between the portion of the to-be-detected member projecting from the shift cover and the shifting position sensor, said speed reduction mechanism reduces a turn-operation amount of the to-be-detected member and transmits the turn-operation amount to the shift position sensor.

19. The transmission for the vehicle according to claim 18, wherein the to-be-detected member is turnably passed through an opening portion provided in the shifting position changing drive means and the shifting position sensor is secured to the outer surface of a gear member covering an external end of the to-be-detected member.

* * * * *